United States Patent
Nicoli et al.

(10) Patent No.: US 7,756,007 B2
(45) Date of Patent: Jul. 13, 2010

(54) METHOD TO IMPROVE CHANNEL ESTIMATE IN BROADBAND SIMO/MIMO CELLULAR RADIO NETWORKS DURING ABRUPT INTERFERENCE VARIATIONS

(75) Inventors: Monica Nicoli, Bergamo (IT); Luigi Sampietro, Cantù (IT); Claudio Santacesaria, Milan (IT); Osvaldo Simeone, Milan (IT); Umberto Spagnolini, Lissone (IT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 87 days.

(21) Appl. No.: 12/224,096

(22) PCT Filed: Feb. 13, 2007

(86) PCT No.: PCT/EP2007/001232

§ 371 (c)(1),
(2), (4) Date: Dec. 1, 2008

(87) PCT Pub. No.: WO2007/093379

PCT Pub. Date: Aug. 23, 2007

(65) Prior Publication Data

US 2010/0067366 A1   Mar. 18, 2010

(30) Foreign Application Priority Data

Feb. 16, 2006   (EP) .................................. 06425094

(51) Int. Cl.
*H04J 11/00* (2006.01)
(52) U.S. Cl. .................... 370/210; 370/334; 370/347
(58) Field of Classification Search ......... 370/200–253, 370/334, 337
See application file for complete search history.

(56) References Cited

U.S. PATENT DOCUMENTS

2002/0172166 A1   11/2002   Arslan et al.

FOREIGN PATENT DOCUMENTS

EP   1 530 333 A1   5/2005

OTHER PUBLICATIONS

Tsai et al.; "DS-CDMA System with Joint Channel Estimation and MAP Detection in Time-Selective Fading Channels"; IEEE Journal on Selected Areas in Communications, vol. 19, No. 1, Jan. 2001, pp. 121-131.
International Search Report for Application No. PCT/EP2007/001232; mailed Apr. 19, 2007.

*Primary Examiner*—Ricky Ngo
*Assistant Examiner*—Iqbal Zaidi
(74) *Attorney, Agent, or Firm*—Staas & Halsey LLP

(57) ABSTRACT

A channel response matrix gathering all unknown elements for all K pilot subcarriers on links between transmitting and receiving antennas, is Least Squares (full-rank) estimated. The interference covariance matrix is estimated from the residual. The correlation of the interference covariance matrix is computed at each new symbol and compared with a threshold. If the interference is significantly changed, the interference covariance matrix is re-initialized, otherwise a running average of the interference covariance matrix is updated with the actual value. Both the updated/re-initialized interference covariance matrix and the autocorrelation matrix of the transmitted pilot sequences (stored in the receiver) are used for whitening the estimated channel matrix before submission to modal filtering for rank reduction. The original spatial and/or temporal correlations are reintroduced in the reduced-rank channel matrix by inverse whitening. After estimation in the discrete-time domain, DFT for conversion is applied for estimation in the whole frequency band.

12 Claims, 7 Drawing Sheets

RECEPTION DISTURBED BY THREE UPLINK INTERFERERS

METHOD TO IMPROVE CHANNEL ESTIMATE IN BROADBAND SIMO/MIMO CELLULAR RADIO NETWORKS DURING ABRUPT INTERFERENCE VARIATIONS

CROSS REFERENCE TO RELATED APPLICATIONS

This application is based on and hereby claims priority to European Application No. 06425094.7 filed on Feb. 16, 2006, the contents of which are hereby incorporated by reference.

BACKGROUND

In the field of wireless telecommunications networks, described below is a method to improve the channel estimate in broadband SIMO/MIMO cellular radio networks during abrupt interference variations (used acronyms are given at the end of the description). The method is suitable to, but it is not restricted, to be employed in the Base Station receivers for broadband multi-cell wireless systems based on frequency reuse in adjacent cells and, if needed, employing the SDMA technique in the same cell. The method could find particular application in cellular systems based on:

- OFDM modulation and TDMA access at the physical layer, such as WiMAX and IEEE 802. 16-2004 Part 16: Air Interface for Fixed Broadband Wireless Access Systems for fixed Subscriber Stations.
- OFDMA-TDMA access at the physical layer, such as WiMAX and IEEE 802.16e Part 16: Air Interface for Fixed and Mobile Broadband Wireless Access Systems for fixed and mobile Subscriber Stations.
- ETSI TS 102 177 Broadband Radio Access Networks (BRAN); HIPERMAN; Physical (PHY) layer.

In addition, modifications may be applied to receivers belonging to Subscriber Stations and/or point-to-point links.

The method described below may be applied to a multicell SIMO system with a single transmitting antenna and at least two receiving antennas. A first improvement is a SIMO system with $N_R > 2$ receiving antennas. A second improvement is a MIMO system with $N_T$ transmitting antennas and $N_R$ receiving antennas. The method estimates the channel response by only accounting for the $N_R$ signals received from the $N_R$ antennas, together with some a priori knowledge and some statistical assumptions on the noise and interference.

As known, the multipath fading together with co-channel interference from subscriber stations in the same or adjacent cells, are the major sources of SINR degradation at the output of the receivers. Usually the multi-cell interference is accounted by a covariance matrix (or noise power) that is assumed as constant, and applying a spatial filter on the received signals (and a pre-filter at the transmitter whenever available) to improve the SINR at the output.

Multiple antennas (SIMO/MIMO) is a known manner to obtain larger values of SINR. When designing the antenna array, diversity and beamforming are two different strategies typically adopted depending on the specific impairment, either interference or fading, that has to be contrasted. There are some degrees of freedom to be exploited when designing the antennas arrays and the receiver processing.

Diversity-oriented schemes take advantage of the spatial multiplex gain for reducing the fade margin. Large antenna spacing compared to the carrier wavelength is used, say larger than 5-8λ, so that signals are uncorrelated at the different antennas and can be processed by diversity-based algorithms, such as MRC. This algorithm needs the knowledge of channel responses at all antennas.

Beamforming-oriented schemes for interference rejection, using small spacing up to λ/2, so that signals are completely correlated at different antennas and beamforming techniques (e.g. MVDR) are adopted to filter out the interferences. Used algorithms require the knowledge of both channel response and the spatial features of the interference power.

A method for estimating multiple OFDM channel response (as specified, for instance in IEEE 2004 or 802.16 e) for MIMO application, without explicit calculation of the DOAs, is described in EP 03425721 European patent application of the same Applicant, titled: METHOD FOR THE ESTIMATION AND TRACKING OF CHANNEL MODES IN MULTICARRIER COMMUNICATION SYSTEMS. Accordingly, the multiple channel response is modelled as a battery of $N_R \times N_T$ FIR filters packed up into a channel matrix, whose elements are all unknown and must be estimated in order to provide the receiver with an estimated channel response for detecting the transmitted data sequence. Initially the receiver performs the LS channel matrix estimate in correspondence of some training sequences mapped into a fixed number of OFDM subcarriers (pilots) and univocally associated to the transmitting antennas. The pilot subcarriers are opportunely distributed into preambles of the transmission frames planned (the preambles) at a rate depending on the variability of the channel: in case of fast variability training data could be sent also every OFDM symbol indeed. The channel estimate performed on the received training sequences avails of a copy of these sequences stored in the receiver. The physical parameters characterizing the channel, such as: cell dimensions, multipath delay/angle patterns, number and angular positions of the interferers, etc., are not made explicit in the channel matrix composition, nevertheless as the channel estimation is precise as the elements of the channel matrix implicitly reflect the effects of the physical parameters.

The unconstrained LS channel estimate is unavoidably noisy because of the cumbersome number of elements to be estimated, opposed to the limited length of the training sequences. The method of the cited document is aimed to reduce the dimension of the LS estimate to obtain a more precise estimation (lower MSE). The dimension of a generic matrix can be accounted by its rank, to say, the minimum number between independent columns or rows. Some algebraic handlings allow decomposing a generic matrix into more suitable equivalent canonical forms; the eigenvalues-eigenvectors decomposition of the LS channel matrix is used. In the real propagation scenario, some known rank reduction methods, such as MDL, starting from the initial full-rank dimension adaptively selects only the most significant leading eigenvectors disregarding the others. The LS-estimated channel matrix is multiplied by a weight matrix to de-correlate, both spatially and temporally, the relevant interferences, at first. Decorrelation is also termed "whitening", for analogy with the white noise completely temporally uncorrelated (flat frequency band), the weighting matrix (matrices) is called "whitening filter", consequently. The whitened channel matrix is submitted to a modal filtering operating on doubly-spatial temporal domain. Modal filtering includes both modal analysis and modal synthesis. Modal analysis allows extracting the only spatial-temporal information actually effective to the estimate; it includes: spatial mode identification, temporal mode identification, and modal components estimation. Modal synthesis gets back a whitened channel matrix with lower rank. The original noise and interference correlations are then restored by inversely weighting (de-whitening) the modal filtered matrix; this operation doesn't change the reduced rank.

Outlined Technical Problem

The way to manage the interference is a critical issue when it cannot be assumed as stationary. In practice, the beneficial effects on greater SINR values obtainable by multiple antennas are worsened by variations of the interfering power induced by:

1. Uncoordinated (asynchronous) accesses of the users among different cells of the multicell environment; for example, new terminals might become active in any of the interfering cells thus generating an abrupt power increase of the interfering signals during the transmission. Dually, active terminals might switch off, thus generating an abrupt power decrease of the interfering signals during the transmission.
2. Vehicular motion of the terminal stations which changes the characteristics of the channel.

Since the interfering power is subject to large fluctuations, in correspondence the SINR deviations may be remarkable (e.g., for a log-normal shadowing having a standard deviation equal to 8 dB, SINR level changes up to 15-20 dB are likely to happen).

The channel estimation and tracking method described in the aforementioned EP 03425721 only tracks the time varying space-time channel for the user of interest under the a priori assumption of stationary interference with constant power. The tracking method is therefore completely unable to remedy for abrupt interference power changes. As a consequence when, in spite of the quasi-constant interference assumption, the interference power suddenly changes for the underlined causes, the updating of the interference covariance matrix (based on a running average with forgetting factor) tends to mask the sudden variation. According to the above, the known method is completely unable to adapt the interference estimate to the real situation. As the interference covariance matrix is used to whiten the channel estimate before submitting it to a modal filtering for the rank reduction, the imprecise estimate of the interference unavoidably reflects into inaccuracy of the final channel estimate. In this event the receiver might incorrectly detect the transmitted data sequence and the BER at the output of the receiver increases. For BER values greater than the maximum permissible threshold, the communication in progress on the interfered channel is lost and the performances of the system are worsened consequently.

SUMMARY

In view of the described state of the art, an aspect is to provide the SIMO/MIMO reduced complexity channel estimation with an operating tool for preventing the dangerous effects of an abrupt change in the space-time interference, still continuing to track the slowly varying interference power.

A primary accomplishment is providing a method for estimating the channel response in a cellular wireless networking with TDMA or TDMA-OFMDA access, the channel being used for connecting a transmitting station equipped with one or more transmitting antennas to at least a receiving station equipped with multiple antenna for receiving sequential modulated OFDM symbols constituted by an assigned number of modulated subcarriers carrying data and pilot sequences assigned to pilot subcarriers diversely allocated in known positions of the OFDM symbols, being the channel affected by sudden and large cochannel interference variations, including:

a) estimating all unknown elements of the channel response for all the pilot sequences on the links between the one or more transmitting antenna and the receiving antennas, from both the received signals and a copy of the pilot sequences stored in the receiver;

b) estimating the interference from the difference between the received pilot sequences and a local reconstruction of the received pilot sequences;

c) updating a running average of the interference estimate used to weight, also termed whitening, the channel estimate;

d) calculating the correlation of the interference estimate between the actual and the preceding received symbols;

e) comparing the actual correlation value against a threshold in order to decide whether the interference is significantly changed or not, either for reinitializing the interference estimate, in the first event, or continuing in the averaging.

The channel matrix is advantageously estimated in the discrete-time domain and successively converted in the frequency domain by a DFT transform.

According to the method, reducing rank includes concurrent updating sub-steps of both the spatial and space-time interference correlation matrices or, alternatively, both the temporal and the spatial interference correlation matrices, being all the correlation matrices either continuously averaged or re-initialized when the interference, approximated as piecewise-stationary, is stated as significantly changed.

Thanks to the re-initialization of the interference estimate the elements of the whitening filter are tuned to the actual situation on the channel and all correlations can be really cancelled from the channel matrix before submitting it to the modal filtering for reducing the rank. Furthermore, the modal filter also avails of the re-initialized interference estimate for a more correct identification of the spatial and temporal or joint space-time components of the channel. This leads to a more correct representation of the channel through the most significant leading eigenvectors of the channel matrix, as their number and the values of the respective elements are both concerned.

BRIEF DESCRIPTION OF THE DRAWINGS

The features of the present invention which are considered to be novel are set forth with particularity in the appended claims. The invention and its advantages may be understood with reference to the following detailed description of a MIMO embodiment thereof taken in conjunction with the accompanying drawings given for purely non-limiting explanatory purposes and wherein:

DETAILED DESCRIPTION OF THE PREFERRED EMBODIMENT

Figure 1:
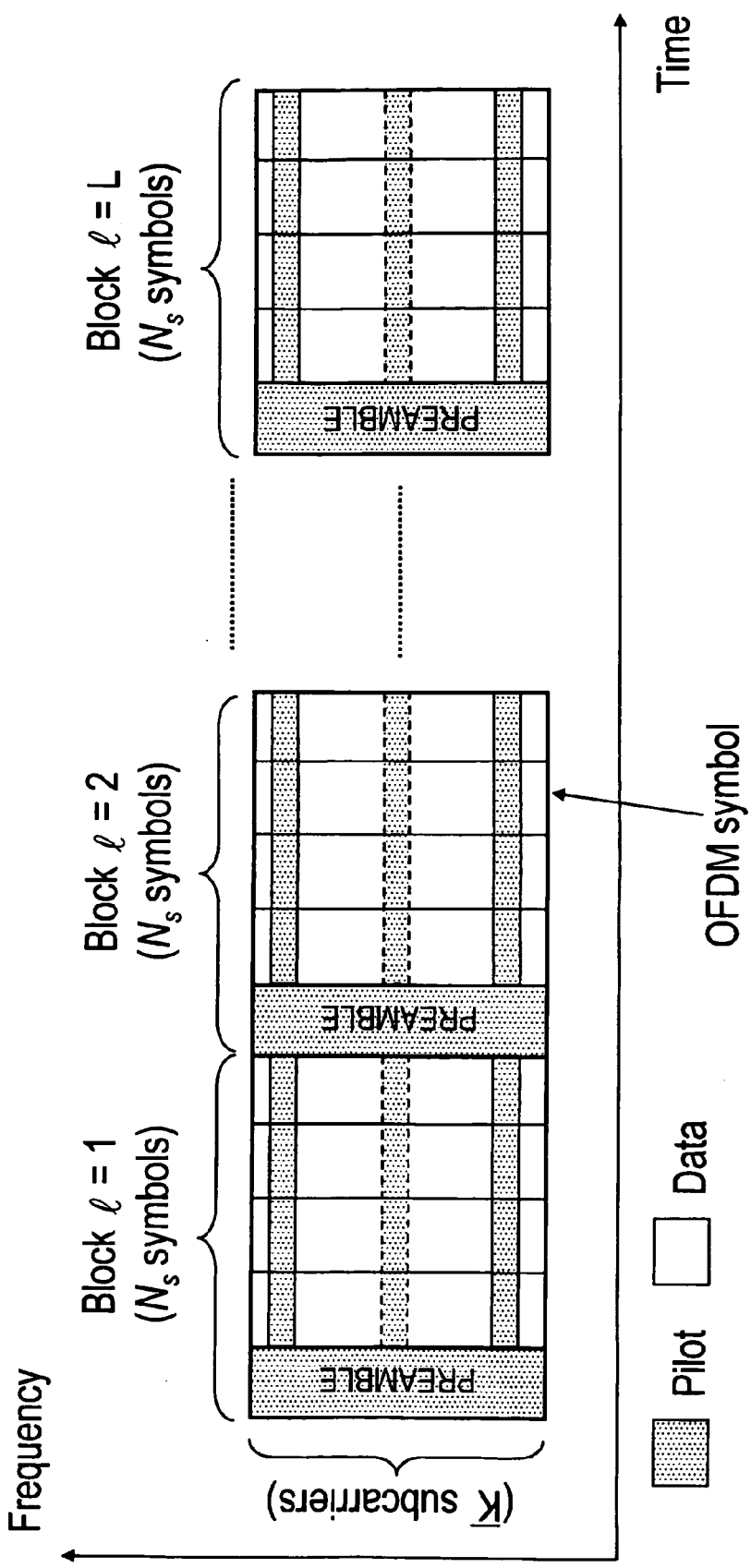
FIG. 1 is a graph of time versus frequency illustrating the frame structure for the uplink channel specified compliant with IEEE 802.16-2004 Part 16.

Reference will now be made in detail to the preferred embodiments, examples of which are illustrated in the accompanying drawings, wherein like reference numerals refer to like elements throughout.

In each cell of the system the multiple access is handled by a combination of time, frequency, and/or space division. With reference for example to FIG. 1 for fixed access and FIG. 2 for mobile or fixed access, within the available bandwidth, composed of N subcarriers, the transmission is organized in L time-frequency resource units, called blocks (or busts), each containing $\overline{K}<N$ subcarriers and a time window of $N_s$ OFDM symbols. Each block includes both coded data and pilot symbols. Pilot subcarriers are distributed over the block to allow the estimation and tracking of the channel/interference parameters. In addition to these distributed pilot subcarriers, a preamble containing only known training symbols could also be included in the block, as shown in the example of FIG. 1. In this case, the preamble is used for the estimation of the channel/interference parameters, while the other pilot subcarriers are used to update the parameters' estimate along the block. Every OFDM symbol of each block may include a subset of pilot subcarriers to be used to track the parameters in fast time-varying channel environments. Note that the same time-frequency unit may be allocated to more users in case SDMA is adopted.

Figure 3:
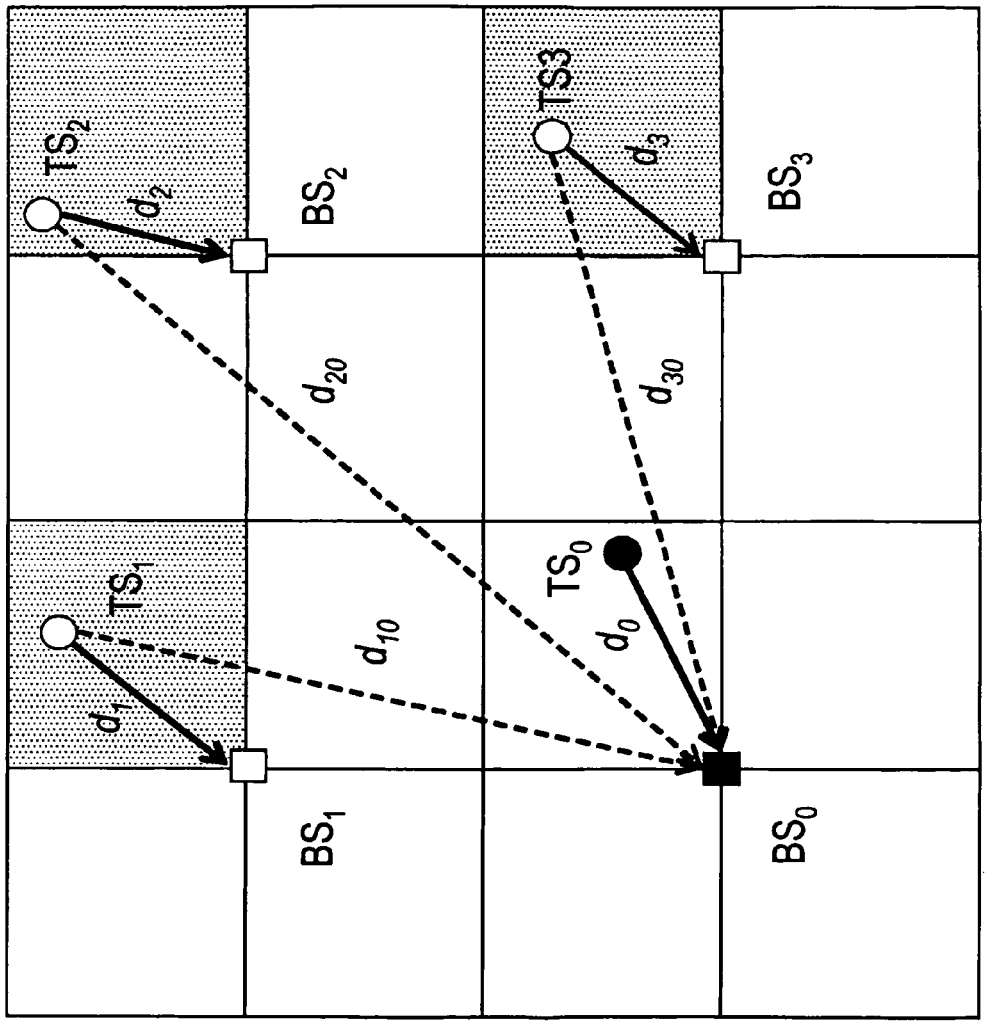
FIG. 3 is a graphical depiction of a matrix illustrating a typical uplink interferer scenario in a wireless cellular system for the reception by a Base Station $BS_0$ of the signal transmitted by the user $SS_0$.

With reference to FIG. 3, let us consider a subscriber station among those simultaneously active in the cell, say $SS_0$, transmitting (or receiving) signals to (from) its own base station $BS_0$ (the communication can be either in the uplink from $SS_0$ to $BS_0$ or in the downlink from $BS_0$ to $SS_0$). Without limitation the transmitter is assumed to employ $N_T$ antennas, and the receiver $N_R$ antennas. The scenario of interest is exemplified for a squared cellular layout with frequency reuse factor F=4. This example refers to an uplink communication where the transmission by $SS_0$ to $BS_0$ is impaired by the interference from $N_i=3$ out-of-cell terminal stations $\{SS_i\}_{i=1}^{N_i}$ that employ the same subcarriers as $SS_0$. In the figure, $d_i$ denotes the distance of the $i^{th}$ terminal from its base station for i=0, ..., $N_i$, while $d_{i0}$ is the distance of the interferer $SS_i$ (with i≠0) from the base station $BS_0$ of the user of interest.

OFDM/OFDMA Transmitter for MIMO Systems

Figure 4:
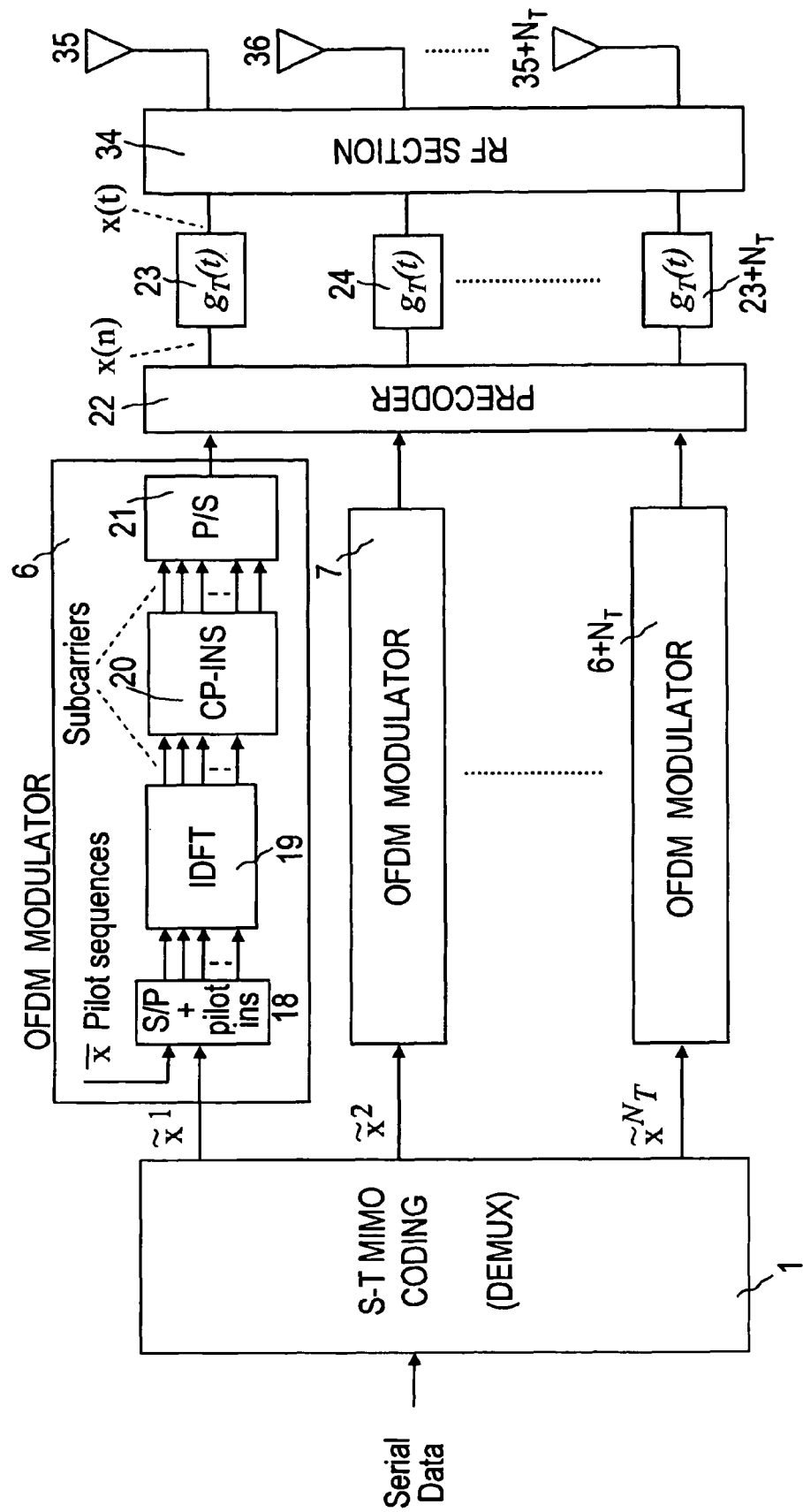
FIG. 4 is a block diagram illustrating the general architecture of an OFDM/OFDMA transmitter with multiple antenna.

The general structure of the OFDM/OFDMA transmitter is represented in FIG. 4. With reference to FIG. 4, the serial data to be transmitted are sent to a block 1 which performs coding, modulation, and multiplexing operations. Block 1 encodes the serial data and adds up FEC redundancy to improve the performance of the receiver. In case of IEEE-802.16-2004, for example, the encoder includes two chained block encoders followed by an interleaver; the outer is Reed-Solomon while the inner is of the convolutional type. The encoded data are submitted to a modulator that maps groups of $2^q$ encoded bits into complex (I, Q) symbols belonging to a constellation of the selected digital modulation (such as M-QAM) and outputs a sequence of complex symbols $\tilde{x}$ parallelized over $N_T$ outputs $\tilde{x}^1, \tilde{x}^2, \ldots, \tilde{x}^{N_T}$ (as the number of the used antennas) connected to $N_T$ OFDM modulators 6, 7, ..., 6+$N_T$.

Figure 2:
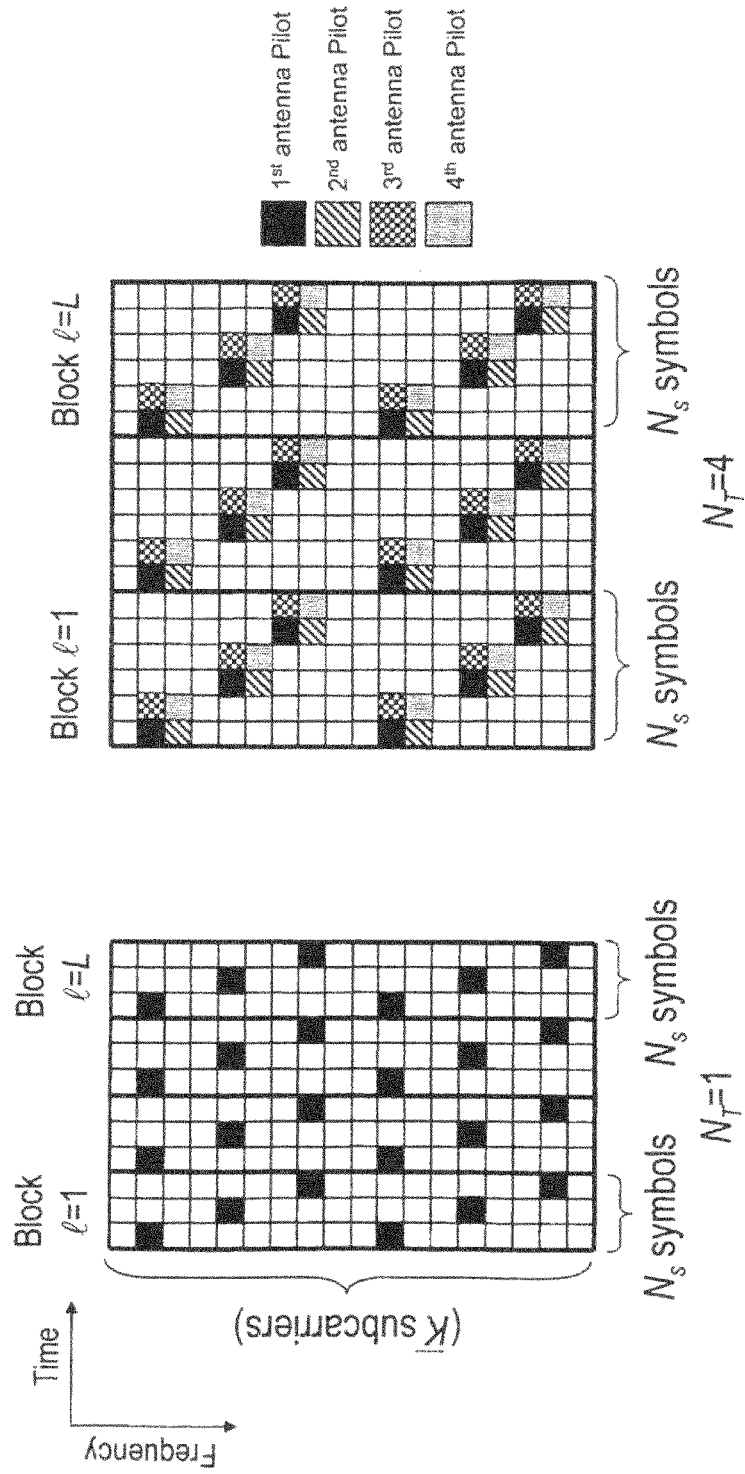
FIG. 2 are graphs of time versus frequency illustrating examples of pilot arrangements across subcarriers and antennas in OFDMA-TDMA access used by wireless communication systems compliant with IEEE 802.16e Part 16.

Every OFDM modulator includes the cascade of the following blocks: S/P+pilot ins 18, IDFT 19, CP-INS 20, and P/S 21. Inside the generic demodulator the respective input sequence $\tilde{x}^s$ are sent to a first input of a S/P converter 18, while to a second input of the same the $\overline{x}$ pilot sequences stored in a relevant memory of the transmitter are sent; both $\tilde{x}^s$ and $\overline{x}$ are series-to-parallel converted by S/P 18 every $T_b$ seconds, obtaining a vector of N elements forwarded to the IDFT processor 19. The latter modulates the N-element vector over the same number of subcarriers (broadband), obtaining an OFDM vector equally long that is forwarded to the CP-INS block 20. This latter adds up a cyclic prefix CP associated to the last $N_{cp}$ samples of the input burst, obtaining an OFDM symbol. The utility of the cyclic prefix is to prevent at the receiver both side effects of the convolution between the transmitted signal and the non-ideal channel response, with generation of ISI between sequential OFDM symbols and ICI between OFDM subcarriers. The IDFT processor according to the used planning and the access type, assigns the available subcarriers to the coded bursts (training and data), except those reserved to the guard time. K out of the total N subcarriers are assigned to the pilot use. Block 20 also inserts the guard subcarriers, so that the total number of subcarriers is N as the number of sub-bands composing the channel band B. The need of making all MIMO transmitting antennas distinguishable to each other is accounted by the assumption of $N_T$ subsets, each including $K/N_T$ different pilot subcarriers associable to the OFDM signals directed to different antennas. FIG. 2 shows an example of pilot arrangement across subcarriers for 4 antennas using different pilot tones for different sources.

The OFDM symbols at the output of the CP-INS block 10 are forwarded to a parallel-to-serial converter P/S 21 clocked at time interval $T_s=T_b+T_g=(N+N_{cp})T_c$, where $T_c$ is the sample time. The OFDM sequence x(n) at the output of the P/S converter 21 is forwarded to one out of $N_T$ inputs of an antenna's PRECODER 22.

The $N_T$ signals outputs of the PRECODER 22 are filtered by $N_T$ raised cosine transmission filters $g_T$(t) 23, 24, ..., 23+$N_T$ in the time domain. The filtered OFDM sequences x(t) are sent to the $N_T$ inputs of a RF SECTION 34 which carries out all known operations for transmitting the analog signal through $N_T$ antennas 35, 36, ..., 35+$N_T$. The RF power amplifiers (not shown) inside the RF SECTION 34 are accurately linearized in a way of not to distort the output in presence of the high PMEPR value characterizing the OFDM transmissions.

OFDM/OFDMA Receiver for MIMO Systems

Figure 5:
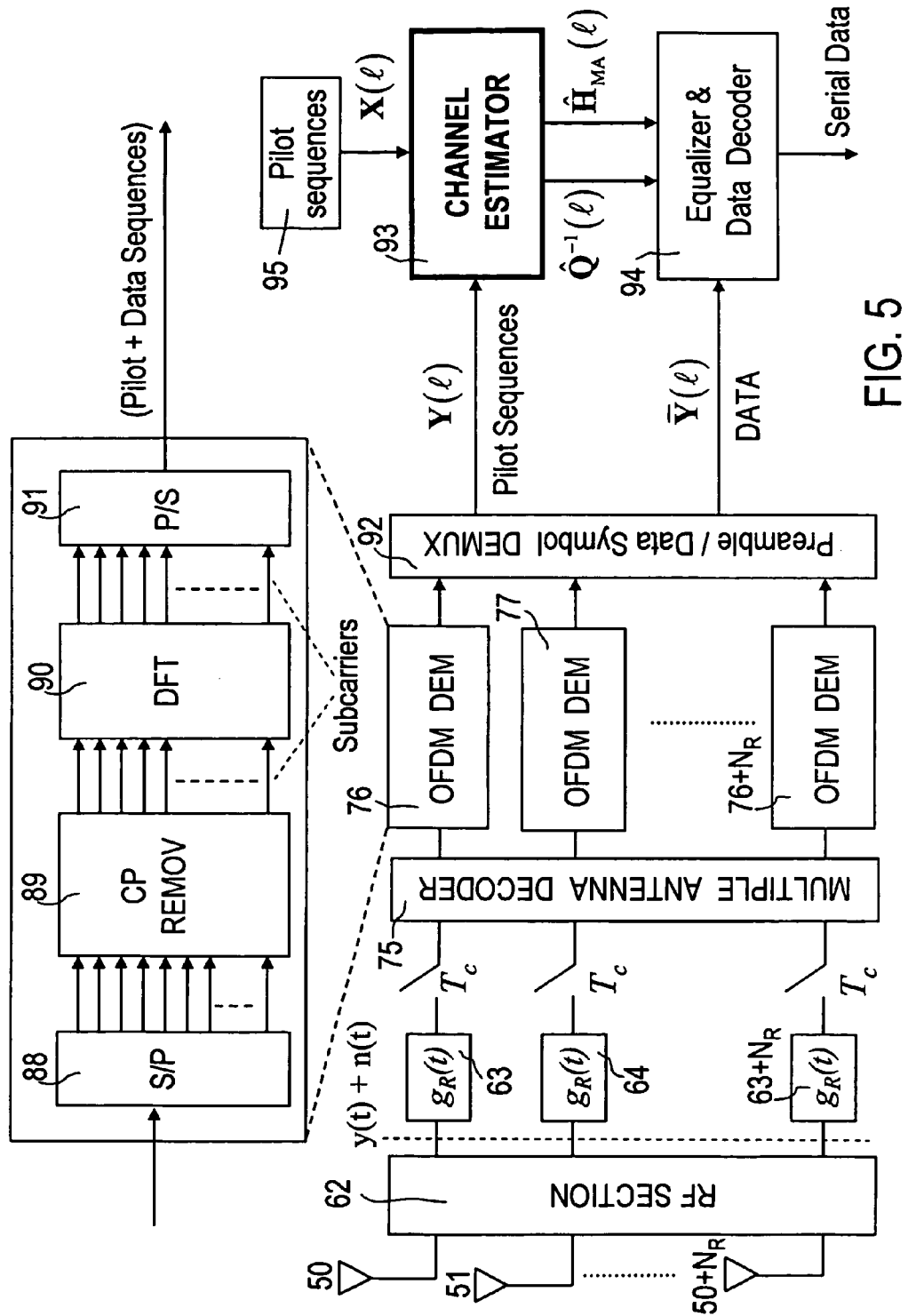
FIG. 5 is a block diagram illustrating the functional architecture of an OFDM/OFDMA receiver with multiple antenna including a channel estimator operating according to the method.

The general structure of the OFDM/OFDMA receiver is represented in FIG. 5. With reference to FIG. 5, the OFDM receiver includes $N_R$ antennas 50, 51, ..., 50+$N_R$ connected to a RF SECTION 62 for receiving the radiofrequency OFDM signals y(t) affected by noise n(t) and convert them to IF and then to baseband. The baseband sequences are filtered by $N_R$ receiving filters $g_R$(t) 63, 64, ..., 63+$N_R$ matched to the transmission filters $g_T$(t). The $N_R$ filtered signals $\tilde{y}$(t) are sampled at sample time $T_c$, (and converted to digital) obtaining $N_R$ discrete signals y(n) forwarded to a "Multiple antenna decoder" 75 operating dually as the Precoder 22 used by the transmitter. The $N_R$ sequences at the outputs of the "Multiple antenna decoder" 75 are directed to respective demodulators OFDM DEM 76, 77, ..., 76+$N_R$, whose structure is shown in the top of the figure.

Every OFDM demodulator includes the cascade of the following blocks: S/P 88, CP REMOV 89, DFT 90, and P/S 91. Inside the generic OFDM demodulator the received baseband signal y(n) is series-to-parallel converted by block S/P 88 clocked at sample time $T_s=(N+N_{cp})T_c$ and forwarded to the CP REMOV 89 for the removal of the cyclic prefix CP. The resulting signal is inputted to the DFT processor 90 for calculating the Discrete Fourier Transform in a way to obtain $N_R$ OFDM signals affected by noise and interference. The $N_R$ serial signals simultaneously present at the output of the battery of $N_R$ OFDM DEM demodulators are sent to the $N_R$ inputs of a demultiplexer block called "Pilot/Data DEMUX" 92 which separates Pilots from Data symbols. The Channel Estimator avails of a pilot matrix X(l) (relevant to Y(l) stored in a memory 95, so that it can estimate both the channel matrix $\hat{H}_{MA}(l)$ with reduced rank and the interference covariance matrix $\hat{Q}(l)$ according to the method.

The Equalizer & Data Decoder block 94 is fed with the actual status information on both channel and interference matrices $\hat{H}_{MA}(l)$ and $\hat{Q}(l)$. Equalization before detecting the transmitted data is a process performed on the received signal $(\overline{Y}(l)$ to compensate for all distortions impressed by the non-ideal channel (H(l)) and to reduce the effects of noise/interference. The equalization is simplified by the OFDM technique noticeably. This derives from the subdivision of the whole channel band into several substantially flat narrow frequency subbands bearing independent data streams. As a result, the equalization of each subband simply involves a multiplication (also termed weighting) of the $k^{th}$ subcarrier by a constant. The weighting process for equalizing the spatial interference is also termed beamforming, and the relative matrix including the weighs is called beamformer. Both equalization and estimation can be advantageously carried out by known methods. The very general architecture of the OFDM multi-antenna receiver visible in FIG. 5 is generally known, but the Channel Estimator 93 will be detailed hereafter.

Interference Mitigation Through Array Processing (MIMO)

The transmitter of FIG. 4 maps the sequence of data to be transmitted to into a sequence of blocks, indexed by l=1, 2, . . . L. Here we focus on the signals received by the receiver of FIG. 5 on the pilot subcarriers only, say K subcarriers out of the total N. The element l indicates the block in general, in case the block has a structure with preamble, as in FIG. 1, the interference shall be tracked intra block symbol-by-symbol. The signals received by the $n_R^{th}$ receiving antenna on the $k^{th}$ pilot subcarrier of the $l^{th}$ block can be written as:

$$y_k^{(n_R)}(l) = \sum_{n_T=1}^{N_T} h_k^{(n_R,n_T)}(l) x_k^{(n_T)}(l) + n_k^{(n_R)}(l), \quad (1)$$

where $h_k^{(n_R,n_T)}$ is the complex channel gain (on the $k^{th}$ subcarrier) for the link between the $n_T^{th}$ transmitting antenna and the $n_R^{th}$ receiving antenna, $x_k^{(n_T)}(l)$ denotes the transmitted pilot symbol, and $n_k^{(n_R)}(l)$ represents additive noise (including the co-channel interference).

By gathering the signals received by the $N_T$ antennas on the K subcarriers into a single $N_R \times K$ matrix:

$$Y(l) = \begin{bmatrix} y_1^{(1)}(l) & y_2^{(1)}(l) & \cdots & y_K^{(1)}(l) \\ y_1^{(2)}(l) & y_2^{(2)}(l) & \cdots & y_K^{(2)}(l) \\ \vdots & \vdots & \ddots & \vdots \\ y_1^{(N_R)}(l) & y_2^{(N_R)}(l) & \cdots & y_K^{(N_R)}(l) \end{bmatrix} \quad (2)$$

we get the signal model:

$$Y(l) = \sum_{n_T=1}^{N_T} H^{(n_T)}(l) X^{(n_T)}(l) + N(l) = H(l)X(l) + N(l). \quad (3)$$

Here the K×K diagonal matrix $X^{(n_T)}(l)=\mathrm{diag}\{x_1^{(n_T)}(l), \ldots, x_K^{(n_T)}\}$ contains the symbols transmitted by the $n_T^{th}$ antenna on all the K pilot subcarriers, while:

$$H^{(n_T)}(l) = \begin{bmatrix} h_1^{(1,n_T)}(l) & h_2^{(1,n_T)}(l) & \cdots & h_K^{(1,n_T)}(l) \\ h_1^{(2,n_T)}(l) & h_2^{(2,n_T)}(l) & \cdots & h_K^{(2,n_T)}(l) \\ \vdots & \vdots & \ddots & \vdots \\ h_1^{(N_R,n_T)}(l) & h_2^{(N_R,n_T)}(l) & \cdots & h_K^{(N_R,n_T)}(l) \end{bmatrix} \quad (4)$$

is the $N_R \times K$ space-frequency channel matrix for the link between the $n_T^{th}$ transmitting antennas and the $N_R$ receiving antennas. Matrices X(l) and H(l) in signal model (3) gather, respectively, the transmitted symbols and the channels for all the transmitting antennas:

$$X(l)=[X^{(1)}(l)^T \ldots X^{(N_T)}(l)^T]^T \quad (5)$$

$$H(l)=[H^{(1)}(l) \ldots H^{(N_T)}(l)] \quad (6)$$

Each space-frequency channel matrix $H^{(n_T)}(l)$ is related, through the DFT operator F, to the $N_R \times W$ space-time channel matrix $\tilde{H}^{(n_T)}(l)$ that gathers by columns the W taps of the discrete-time channel impulse response in the time-domain:

$$H^{(n_T)}(l)=\tilde{H}^{(n_T)}(l)F^T \quad (7)$$

The element (k, w) of the K×W matrix F, for k=1, . . . , K and w=1, . . . , W, is defined as:

$$F_{k,w} = \exp\left[-\frac{j2\pi}{N} n_k(w-1)\right], \quad (8)$$

with $n_k \in \{0, \ldots, N-1\}$ denoting the frequency index for the $k^{th}$ useful subcarrier and N the total number of subcarriers. The multiplication by matrix F in (6) performs the DFT transformation of the matrix $\tilde{H}^{(n_T)}(l)$ by rows.

Using (7), the signal model (3) can be written in terms of the space-time channel matrices as:

$$Y(l) = \sum_{n_T=1}^{N_T} \tilde{H}^{(n_T)}(l) \tilde{X}^{(n_T)}(l) + N(l) = \tilde{H}(l)\tilde{X}(l) + N(l), \quad (9)$$

where $\tilde{X}^{(n_T)}(l)=F^T X^{(n_T)}(l)$ and $\tilde{X}^{(n_T)}(l)=[\tilde{X}^{(1)}(l)^T \ldots \tilde{X}^{(N_T)}(l)^T]^T$.

The overall $N_R \times WN_T$ space-time MIMO channel matrix is defined as:

$$\tilde{H}(l) = [\tilde{H}(l) \ldots \tilde{H}^{(NT)}(l)]. \quad (10)$$

Channel Estimation in Time-Varying Interference

The estimation of the channel/interference parameters is performed assuming a piecewise stationary interference whose spatial covariance matrix may change abruptly in any block, while the channel matrix H(l) can be either constant or time-varying over the blocks, depending on the terminal mobility. In case of fixed/nomadic applications, the channel H(l) can be considered as constant for several blocks. In mobile applications H(l) is time-varying, due to the fading amplitudes that can change from block to block. On the other hand, the variations of the directions of arrival/departure and the times of arrival in the multipath structure of H(l) are assumed to be slower than those of the fading amplitudes.

Significant variations of the interference are due to the cochannel interference generated by uncoordinated accesses from the users (see FIG. 3) inside a cell of adjacent clusters, or in the same SDMA cell. In this event the interference covariance matrix has to be tracked either at symbol rate or block rate, and the channel estimate updated consequently. The fast interference tracking is useful both for fixed and mobile WiMAX, although in the second case (IEEE 802.16e) there are further reasons, for example:

- Due to the mobility of the Subscriber Stations, both the channel parameters and the interference may vary faster than the fixed case.
- Pilot carriers for uplink are not prevalently concentrated into a preamble included in the first OFDM symbol, but rather more densely distributed into each OFDMA symbol, this helps the fast updating of both the channel and the interference matrices.
- The increased probability of new spatial interference as a consequence of the OFDMA accesses.

Figure 6:
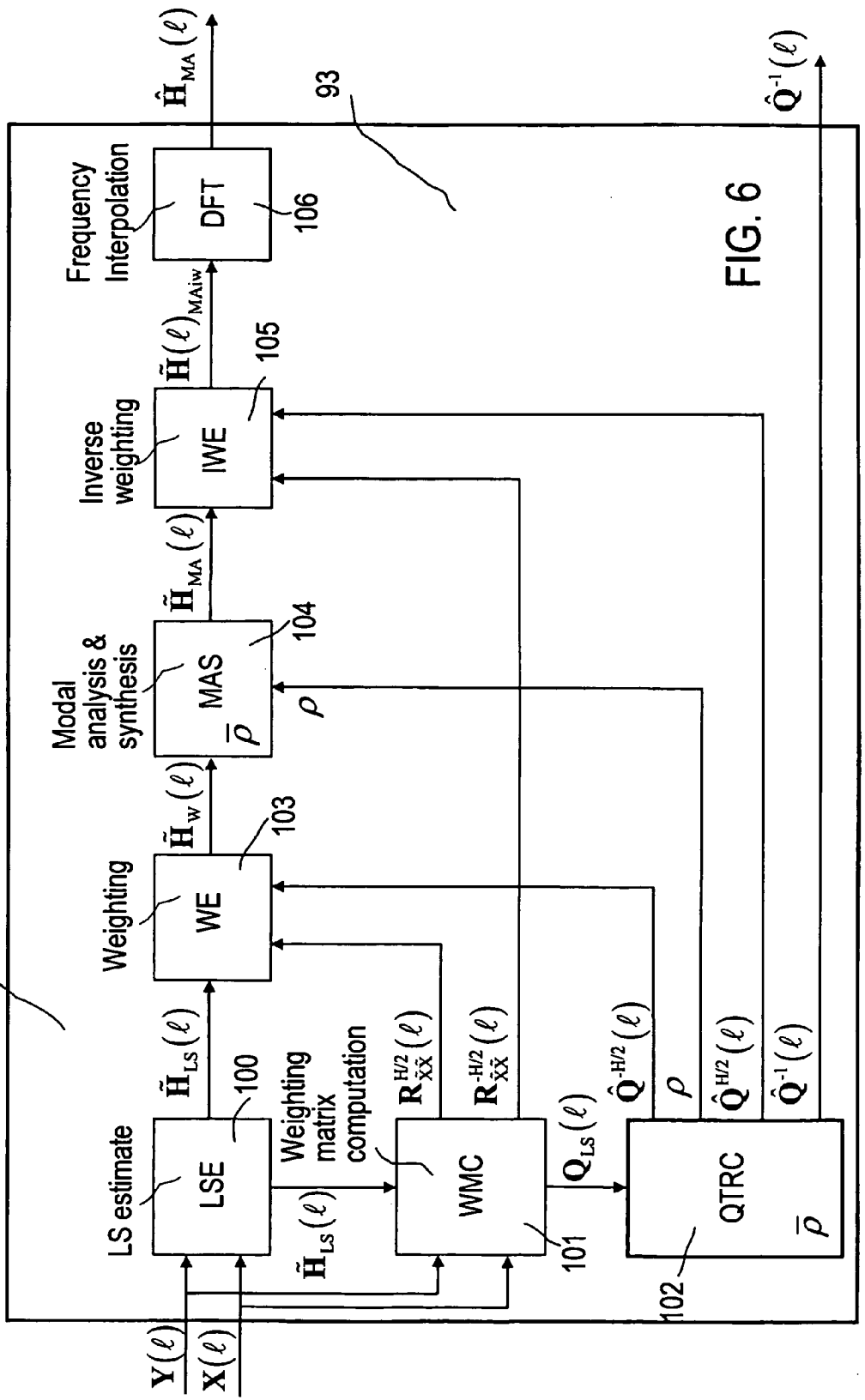
FIG. 6 is a block diagram illustrating the functional architecture of a channel estimator block included in the receiver of FIG. 5.
Figure 7:
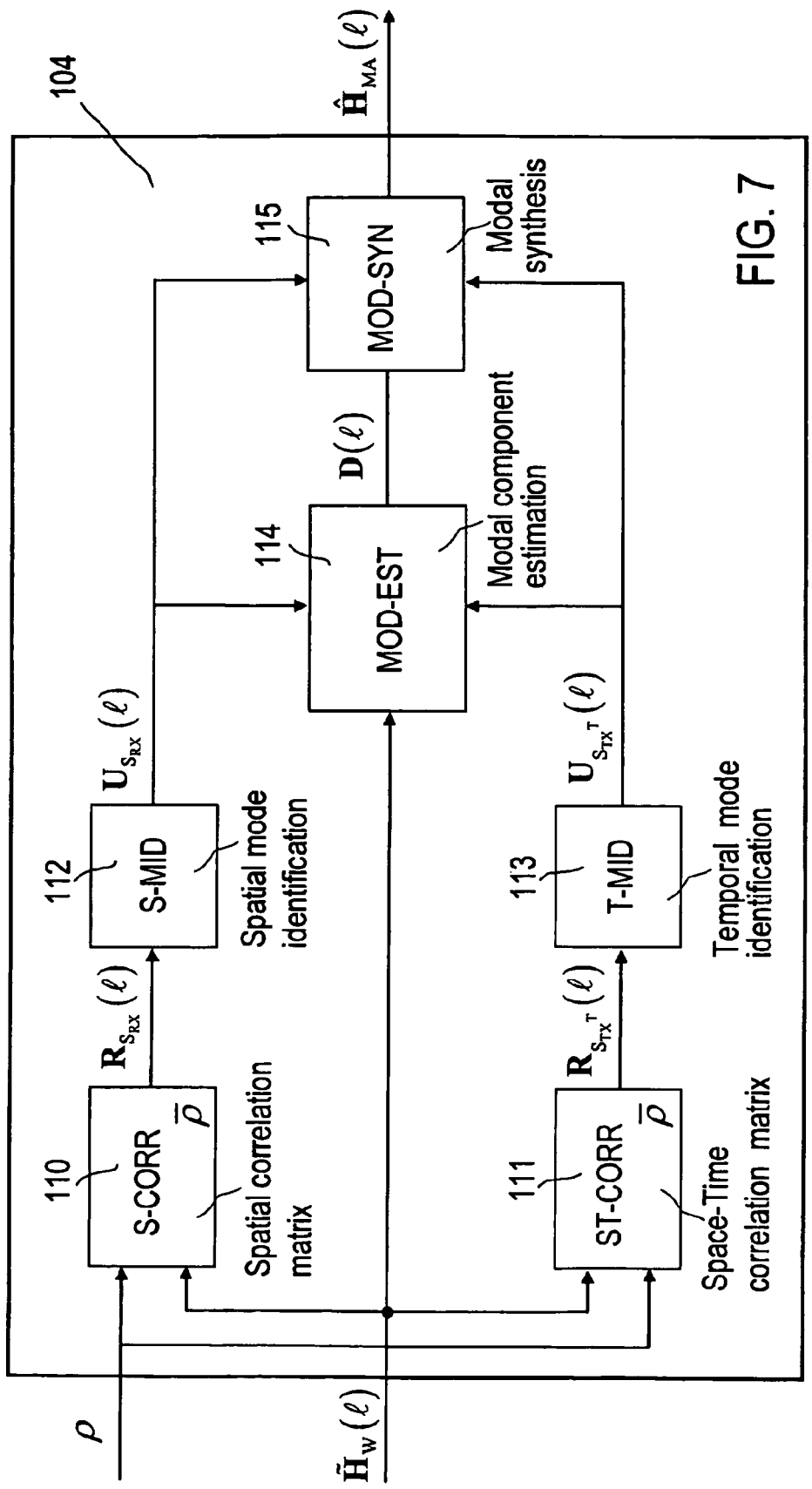
FIG. 7 is a block diagram illustrating the functional architecture of a modal analyzer & synthesizer MAS block included in the channel estimator of FIG. 6.

The functional architecture of the Channel Estimator block 93 (FIG. 5) is detailed in FIGS. 6 and 7. The Channel Estimator block 93 estimates the final channel matrix $\hat{H}_{MA}(l)$ in the frequency domain according to the following sequential operations: a) Least-Squares channel estimation; b) Tracking of the interference covariance; c) Weighting (Whitening); d) Modal filtering; e) Inverse weighting (de-whitening; and f) Interpolation. In its turn the Modal filtering includes: D1a) Spatial correlation concurrently executed with D1b) Space-time correlation; D2a) Spatial mode identification concurrently executed with D2b) Temporal mode identification; D3) Modal component estimation; and D4 Modal synthesis. As a variant of the Modal filtering, operations D1a) and D1b) are replaced with Temporal correlation and Spatial correlation, respectively, and the next identification operations D2a) and D2b) are modified accordingly, in accordance with the following.

Least-Squares Channel Estimation

With reference to FIG. 6, the Channel estimator 93 includes a LSE block 100 which receives the two pilot matrices X(l), Y(l), and calculates in correspondence the so-called Least Squares estimate of the space-time MIMO channel as:

$$\tilde{H}_{LS}(l) = \underset{\tilde{H}}{\operatorname{argmin}} \|Y(l) - \tilde{H}(l)\tilde{X}(l)\|^2, \quad (11)$$

the solution of this minimum problem is:

$$\tilde{H}_{LS}(l) = Y(l)\tilde{X}^H(l)(\tilde{X}(l)\tilde{X}^H(l))^{-1} = R_{yx}(l)R_{xx}^{-1}(l), \quad (12)$$

where:

$$R_{yx}(l) = Y(l)\tilde{X}^H(l) \quad (13)$$

of $N_R \times N_T W$ elements is the cross-correlation matrix between transmitted data (stored pilot sequences) and corresponding received signals; and $$R_{xx}(l) = X(l)\tilde{X}^H(l) \quad (14)$$

of $N_T W \times N_T W$ elements is the autocorrelation of the transmitted data.

The channel estimate (12) is more concisely represented as:

$$\tilde{H}_{LS}(l) = Y(l)\tilde{X}(l)^\dagger, \quad (15)$$

where $(\bullet)^\dagger$ denotes the pseudoinverse operator:

$$\tilde{X}^\dagger(l) = \tilde{X}^H(l)(\tilde{X}(l)\tilde{X}^H(l))^{-1} \quad (16)$$

as also defined in paragraph 5.5.4 (pag. 257) of the book titled: "MATRIX COMPUTATIONS", authors: Gene. H. GOLUB, Charles F. VAN LOAN, Third Edition 1996, Published by Johns Hopkins University Press, Baltimore and London, ISBN 0-8018-5413-X, which is a very useful bibliographic reference on matrix theory. The LS estimate (12) is in general a full-rank matrix.

The two pilot X(l), Y(l) and the channel estimate $\tilde{H}_{LS}(l)$ matrices are input to a block WMC 101 which estimates the spatial noise (or interference) covariance matrix $Q_{LS}(l)$ as:

$$Q_{LS}(l) = \frac{1}{K}(Y(l) - \tilde{H}_{LS}(l)\tilde{X}(l))(Y(l) - \tilde{H}_{LS}(l)\tilde{X}(l))^H. \quad (17)$$

The same block 101 also calculates the pilot correlation matrix:

$R_{xx} = \tilde{X}(l)\tilde{X}^H(l)$ and then derives the following two expressions useful for weighting (whitening): $R_{xx}^{H/2} = (\tilde{X}(l)\tilde{X}^H(l))^{H/2}$ (i.e., the Hermitian of the Cholesky factor of $R_{xx}$) and $R_{xx}^{-H/2} = (\tilde{X}(l)\tilde{X}^H(l))^{-H/2}$ (i.e., the inverse of $R_{xx}^{H/2}$).

Tracking of the Interference

The estimate (17) is input in a tracking block QTRC 102 to be compared with the estimate in the previous block in order to decide whether the interference has changed or not. This operation is herein performed by computing the correlation between the noise covariance matrix at two successive instants as:

$$\rho(l) = \frac{tr[Q_{LS}(l)Q_{LS}(l-1)]}{\|Q_{LS}(l)\| \cdot \|Q_{LS}(l-1)\|} \quad (18)$$

where $\|\bullet\|$ denotes the Frobenius norm of the argument matrix. If the correlation $\rho(l)$ is larger than a given threshold $\tilde{\rho}$, set to a numerical value about 0.8, the interference covariance estimate can be refined by a sample average, otherwise the estimate is re-initialized according to the new estimate value (11):

$$\hat{Q}(l) = \begin{cases} (1-\mu)Q_{LS}(l) + \mu\hat{Q}(l-1), & \rho \geq \bar{\rho} \\ Q_{LS}(l), & \rho < \bar{\rho}. \end{cases} \quad (19)$$

$0 \leq \mu \leq 1$ is an exponential forgetting factor used in the running average. The tracking QTRC 102 outputs the actual value of $\rho$ (18) and $\hat{Q}^{-H/2}(l)$, $\hat{Q}^{H/2}(l)$, $\hat{Q}^{-1}(l)$ matrices, the last is outputted by the Channel Estimator 93.

Weighting (Whitening)

The first-stage channel estimate $\tilde{H}_{LS}(l)$ is pre-processed by a weighting block WE 103, which receives the two matrices $\hat{Q}^{-H/2}(l)$, $R_{xx}^{H/2}=(\tilde{X}(l)\tilde{X}^H(l))^{H/2}$ and performs on the LS channel estimate a spatial-temporal whitening yielding:

$$\tilde{H}_w(l)=[\tilde{H}_w^{(1)}(l) \ldots \tilde{H}_w^{(N_T)}(l)]=\hat{Q}^{-H/2}(l)\tilde{H}_{LS}(l)R_{xx}^{H/2}. \quad (20)$$

The weighting can be reduced to a spatial whitening only $$\tilde{H}_w(l)=[\tilde{H}_w^{(1)}(l) \ldots \tilde{H}_w^{(N_T)}(l)]=\hat{Q}^{-H/2}(l)\tilde{H}_{LS}(l) \quad (20a)$$

when pilot sequence properties are such that $R_{xx}$ can be approximated as diagonal with a slight degradation of estimate performance.

Modal Filtering

The whitened channel matrix $\tilde{H}_w(l)$ (20) from the tracking block QTRC is forwarded to a block MAS 104, which receives the actual value of $\rho$ (18), and executes a Modal filtering that will be described in detail with reference to the successive figure. At the output of block MAS 104 a reduced-rank channel estimation matrix $\tilde{H}_{MA}(l)$ is provided.

Inverse Weighting (De-Whitening)

The channel matrix $\tilde{H}_{MA}(l)$ is directed to a block IWE 105 to be inverse weighted (de-whitened) by the two matrices $R_{xx}^{-H/2}$ and $\hat{Q}^{H/2}(l)$ coming from blocks 101 and 102, respectively. De-whitening is executed as:

$$\tilde{H}_{MAiw}(l)=[\tilde{H}_{MAiw}^{(1)}(l) \ldots \tilde{H}_{MAiw}^{(N_T)}(l)]=\hat{Q}^{H/2}(l)\tilde{H}_{MA}(l)R_{xx}^{-H/2} \quad (21)$$

for introducing the original space-time correlations but in the reduced-rank matrix.

The inverse weighting can be reduced to a spatial inverse whitening only:

$$\tilde{H}_{MAiw}(l)=[\tilde{H}_{MAiw}^{(1)}(l) \ldots \tilde{H}_{MAiw}^{(N_T)}(l)]=\hat{Q}^{H/2}(l)\tilde{H}_{MA}(l) \quad (21a)$$

when pilot sequence properties are such that $R_{xx}$ can be approximated as diagonal with a slight degradation of estimate performance.

Interpolation

The cascaded block DFT 106 receives the channel estimation matrix $\tilde{H}_{MAiw}(l)$ and $\tilde{H}_{MAiw}^{(n_T)}(l)$, for $n_T=1, 2, \ldots, N_T$ is interpolated over the entire bandwidth to get the $N_R \times K$ final estimate $\hat{H}_{MA}^{(n_T)}(l)$ in the frequency domain as:

$$\hat{H}_{MA}^{(n_T)}(l)=\tilde{H}_{MAiw}^{(n_T)}(l)\bar{F}^T \quad (22)$$

where $\bar{F}$ is the $\bar{K} \times W$ DFT operator. The overall channel estimate is $$\hat{H}_{MA}(l)=[\hat{H}_{MA}^{(1)}(l) \ldots \hat{H}_{MA}^{(N_T)}(l)].$$

The Modal filtering is detailed with reference to in FIG. 7, where the functional architecture of the Modal Analyser-Synthesizer MAS block 104 (FIG. 6) is illustrated.

Correlations

Both matrix $\tilde{H}_w(l)$ (20) and the correlation value $\rho$ (18) are input to two calculation blocks S-CORR 110 and ST-CORR 111 which also store the threshold value $\bar{\rho}$. The first one updates/re-initializes the spatial correlation matrix $R_{S_{RX}}(l)$, the second one updates/re-initializes the space-time correlation matrix $R_{S_{RX}T}(l)$.

Spatial Correlation

Concerning the S-CORR 110, If $\rho \geq \bar{\rho}$ the $l^{th}$ whitened estimate $\tilde{H}_w(l)$ is used to update the $N_R \times N_R$ spatial correlation matrix:

$$R_{S_{RX}}(l)=(1-\mu_{S_{RX}})\tilde{H}_w(l)\tilde{H}_w^H(l)+\mu_{S_{RX}}R_{S_{RX}}(l-1), \quad (23)$$

otherwise the correlation is re-initialized as $R_{S_{RX}}(l)=\tilde{H}_w(l)\tilde{H}_w(l)^H$. The scalar $0\leq\mu_{S_{RX}}\leq 1$ is an exponential forgetting factor.

Space-Time Correlation

Concerning the ST-CORR 111, the $WN_T \times WN_T$ space-time correlation matrix is updated as well according to:

$$R_{S_{TX}T}(l)=(1-\mu_{S_{TX}T})\tilde{H}_w(l)+\mu_{S_{TX}T}R_{S_{TX}T}(l-1) \quad (24)$$

otherwise is re-initialized. The scalar $0\leq\mu_{S_{TX}T}\leq 1$ is an exponential forgetting factor.

Spatial Mode Identification

The $R_{S_{RX}}(l)$ matrix from block 110 is input to a cascaded S-MID block 112 which calculates the $N_R \times r_{S_{RX}}$ spatial modes $U_{S_{RX}}(l)$ as the $r_{S_{RX}}$ leading eigenvectors of the matrix $R_{S_{RX}}(l)$, with $1 \leq r_{S_{RX}} \leq N_R$.

Temporal Mode Identification

The $R_{S_{TX}T}(l)$ matrix from block 111 is input to a cascaded T-MID block 113 which similarly evaluates the $WN_T \times r_{S_{TX}T}$ spatial-temporal modes $U_{S_{TX}T}(l)$ from the $r_{S_{TX}T}$ leading eigenvectors of the matrix $R_{S_{TX}T}(l)$, with $1 \leq r_{S_{TX}T} \leq N_T W$.

Modal Component Estimation

The three matrices $U_{S_{RX}}(l)$, $U_{S_{TX}T}(l)$ and $\tilde{H}_w(l)$ are inputted to a block MOD-EST 114 which calculates the corresponding channel modal components by:

$$D(l)=U_{S_{RX}}^H(l)\tilde{H}_w(l)U_{S_{TX}T}(l) \quad (25)$$

where D(l) is a $r_{S_{RX}} \times r_{S_{TX}T}$ matrix.

Modal Synthesis

The three matrices $U_{S_{RX}}(l)$, $U_{S_{TX}T}(l)$ and D(l) are inputted to a block MOD-SYN 115, which obtains the matrix whitened channel estimate $\tilde{H}_{MA}(l)$ through the modal synthesis:

$$\tilde{H}_{MA}(l)=U_S(l)D(l)U_{S_{TX}T}^H(l) \quad (26)$$

Alternative Embodiment to Correlation and Identification

As an alternative to the matrix $R_{S_{TX}T}(l)$, the $W \times W$ temporal correlation matrix and the $N_T \times N_T$ spatial correlation matrix can be used:

$$R_T(l) = (1-\mu_T)\sum_{n_T=1}^{N_T}\tilde{H}_w^{(n_T)}(l)^H\tilde{H}_w^{(n_T)}(l) + \mu_T R_T(l-1) \quad (27)$$

$$R_{S_{TX}}(l) = (1-\mu_{S_{TX}})\bar{H}_w(l)\bar{H}_w(l)^H + \mu_{S_{TX}}R_{S_{TX}}(l-1) \quad (28)$$

where: $\bar{H}_w(l)=[vec(\tilde{H}_w^{(1)}(l)) \ldots vec(\tilde{H}_w^{(N_T)}(l))]^T$ and $0\leq\mu_T\leq 1$ and $0\leq\mu_{STX}\leq 1$ are exponential forgetting factors.

In this case, the $WN_T \times r_{S_{TX}T}$ spatial-temporal modes $U_{S_{TX}T}(l)$ are evaluated as: $U_{S_{TX}T}(l)=U_{S_{TX}}(l)\otimes U_T(l)$ from the $r_{S_{TX}}$ leading eigenvectors of the matrix $R_{S_{TX}}(l)$, with $1 \leq r_{S_{TX}} \leq N_T$ and the $r_T$ leading eigenvectors of the matrix $R_T(l)$, with $1 \leq r_T \leq W$.

Alternative Embodiment to Spatial Mode Identification

When the interference is fast-varying with respect to the channel (e.g., the interference covariance changes on each block) then it may be convenient to avoid the computation of the channel spatial correlation $R_{S_{TX}}(l)$ and set: $r_{S_{RX}} = N_R$, $U_{S_{RX}}(l) = I_{N_R}$. In this case only the temporal modes $R_{S_{TX}T}(l)$ are exploited for channel estimation.

Modal Components Tracking (Optional)

To improve the estimate performance, the modal components D(l) can be tracked over the blocks by standard tracking methods, such as LMS, RLS, or Kalman algorithm.

Detection

With reference to FIG. 5, the "Equalizer & Data Decoder" performs the detection in known manner from the knowledge of both the channel estimated matrix $\tilde{H}_{MA}(l)$ and the updated covariance matrix $\hat{Q}(l)$.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

ACRONYMS

AWGN—Additive White Gaussian Noise
BRAN—Broadband Radio Access Networks
DFT—Discrete Fourier Transform
DOA—Direction Of Arrival
ETSI—European Telecommunications Standards Institute
FEC—Forward Error Correction
ICI—InterCarrier Interference
IDFC—Inverse Discrete Fourier Transform
IEEE—Institute of Electrical and Electronics Engineers
ISI—Inter Symbolic Interference
LS—Least Squares
MAN—Metropolitan Area Networks
MAP—Maximum a Posteriori
MDL—Minimum Description Length
MIMO—Multiple Input Multiple Output
MRC—Maximum Ratio Combining
MSE—Mean Square Error
MVDR—Minimum Variance Distortionless Response
OFDM—Orthogonal Frequency Division Multiplexing
OFDMA—Orthogonal Frequency Division Multiplex Access
PMEPR—Peak-to-Mean Envelope Power Ratio
SDMA—Space Division Multiple Access
SIMO—Single Input Multiple Output
SINR—Signal to Interference and Noise Ratio
SNR—Signal to Noise Ratio
TDMA—Time Division Multiple Access
WiMAX—Worldwide Interoperability for Microwave Access

The invention claimed is:

1. A method for estimating channel response in a cellular wireless network using time division multiple access or time division multiple access-orthogonal frequency division multiplex access in a channel used for connecting a transmitting station equipped with at least one transmitting antenna to at least one receiving station equipped with multiple receiving antennas for receiving sequential modulated orthogonal frequency division multiplex symbols constituted by an assigned number of modulated subcarriers carrying data and pilot sequences assigned to pilot subcarriers diversely allocated in known positions of the orthogonal frequency division multiplex symbols, the channel being affected by sudden and large co-channel interference variations, comprising:

generating a channel estimate by estimating all unknown elements of the channel response for all the pilot sequences on links between the at least one transmitting antenna and the receiving antennas, from both received signals and a copy of the pilot sequences stored in the receiving station;

generating an interference estimate from a difference between received pilot sequences and a local reconstruction of the received pilot sequences;

updating a running average of the interference estimate used in weighting the channel estimate;

calculating a correlation value of the interference estimate between actual and preceding received symbols;

comparing the correlation value against a threshold to decide whether there is a significant change in interference; and reinitializing the interference estimate, if the correlation value is lower than the threshold, otherwise continuing said updating of the running average.

2. The method as recited in claim 1, wherein said updating of the running average includes integrating a forgetting factor, wherein the weighting of the channel estimate produces a weighted channel matrix with spatial and/or temporal correlations cancelled, by multiplying by a weighting matrix depending on an interference covariance matrix estimate, and multiplying by a correlation matrix of the copy of the pilot sequences, wherein said generating the channel estimate includes gathering estimates of the unknown elements of the channel response in a full-rank channel matrix, and wherein said method further comprises:

generating the interference covariance matrix estimate;

reducing a rank of the weighted channel matrix to only most significant leading eigenvectors to produce a reduced rank channel matrix; and multiplying the reduced rank channel matrix by an inverse-weighting matrix restoring at least one of original space, time and space-time correlations.

3. The method as recited in claim 2, wherein said reducing the rank of the weighted channel matrix includes at least one of updating both spatial and space-time interference correlation matrices, and updating both temporal and spatial interference correlation matrices, and wherein said method further comprises reinitializing all the correlation matrices when the interference is significantly changed based on said comparing of the correlation value threshold, and otherwise continuing said updating thereof.

4. The method as recited in claim 3, wherein the large co-channel interference variations are generated by uncoordinated accesses/releases of user stations in different cells of a multicell environment reusing a single carrier.

5. The method as recited in claim 4, wherein $N_T$ independent sets of pilot subcarriers are allocated to $N_T$ transmitting antennas according to an allocation known at the receiving station.

6. The method as recited in claim 5, wherein said gathering the estimates of the unknown elements of the channel response is performed for $N_R \times N_T$ links between the $N_T$ transmitting antennas and $N_R$ receiving antennas.

7. The method as recited in claim 6, wherein said gathering the estimates of the unknown elements of the channel response is based on a $N_R \times N_T \times K$-dimensional channel matrix relevant to the $N_R \times N_T$ links and K subcarriers estimated in a discrete-time domain spanning a $N_R \times N_T \times W$-dimensional channel matrix, where $W \leq K$, with W samples of a truncated discrete-time channel impulse response on each of the links, on condition that the copy of the pilot sequences correspond to a Discrete Fourier Transform of the pilot sequences transmitted from the transmitting station.

8. The method as recited in claim 7, wherein the $N_R \times N_T \times W$-dimensional channel matrix is submitted to the Discrete Fourier Transform for obtaining an $N_R \times N_T \times K$-dimensional equivalent matrix in a frequency domain.

9. The method as recited in claim 8, wherein the pilot subcarriers are prevalently concentrated in a preamble allocated in a first orthogonal frequency division multiplex symbol of each block of symbols composing a time frame, and less densely allocated in other symbols to cope with fixed stations.

10. The method as recited in claim 8, wherein the pilot subcarriers are near equally distributed along all the sequential orthogonal frequency division multiplex symbols, to cope with mobile stations.

11. The method as recited in claim 8, wherein the full-rank channel matrix is obtainable by multiplying the $N_R \times N_T \times W$-dimensional channel matrix by a pseudoinverse operator.

12. The method as recited in claim 11, wherein the threshold is substantially 0.8 decibel.

* * * * *